United States Patent [19]

Geltz et al.

[11] Patent Number: 4,895,471
[45] Date of Patent: Jan. 23, 1990

[54] EXPANDER MECHANISM FOR TELESCOPING TUBES

[75] Inventors: Charles E. Geltz, Drexel Hill; Fernando Guerrero, West Chester, both of Pa.

[73] Assignee: Zenith Products Corporation, Aston, Pa.

[21] Appl. No.: 169,659

[22] Filed: Mar. 18, 1988

[51] Int. Cl.⁴ .............................................. F16B 7/10
[52] U.S. Cl. .................................... 403/104; 403/109; 403/377; 211/105.3
[58] Field of Search ............... 403/109, 105, 106, 104, 403/377, 110, 371, 375; 211/105.4, 105.3

[56] References Cited

U.S. PATENT DOCUMENTS

| 424,610 | 4/1890 | Laurence . | |
| 453,631 | 6/1891 | Farley . | |
| 670,585 | 3/1901 | Fowler . | |
| 772,829 | 10/1904 | Russell, Jr. . | |
| 914,876 | 3/1909 | Phinney . | |
| 1,253,486 | 1/1918 | Hammer . | |
| 1,356,454 | 10/1920 | Knight . | |
| 1,679,881 | 8/1928 | Simpson . | |
| 1,910,555 | 5/1933 | Marlowe . | |
| 2,275,236 | 3/1942 | Shannon . | |
| 2,293,168 | 8/1942 | Pirone . | |
| 2,462,321 | 2/1949 | Holmes . | |
| 2,562,371 | 7/1951 | Shannon . | |
| 2,567,374 | 9/1951 | Greco | 403/371 |
| 2,668,386 | 2/1954 | Benner, Jr. | 403/104 X |
| 2,919,134 | 12/1959 | Zuro . | |
| 2,969,881 | 1/1961 | Lilly . | |
| 3,560,032 | 2/1971 | Cohen et al. | 403/104 |
| 3,674,294 | 7/1972 | Kirkham | 403/104 |
| 4,076,437 | 2/1978 | Mazzolla | 403/110 X |
| 4,134,703 | 1/1979 | Hinners | 403/104 |
| 4,366,774 | 1/1983 | Haake et al. . | |
| 4,378,071 | 3/1983 | Yakimicki . | |
| 4,598,572 | 7/1986 | Mondello et al. | 403/375 X |
| 4,632,597 | 12/1986 | Clausen et al. | 403/104 X |

FOREIGN PATENT DOCUMENTS

| 2053934 | 8/1982 | Fed. Rep. of Germany . | |
| 2342624 | 9/1977 | France | 403/109 |
| 101619 | 3/1941 | Sweden . | |
| 1527393 | 10/1978 | United Kingdom | 403/109 |

Primary Examiner—Randolph A. Reese
Assistant Examiner—Peter M. Cuomo
Attorney, Agent, or Firm—Panitch Schwarze Jacobs & Nadel

[57] ABSTRACT

An expander mechanism to be used with telescoping tubes which might form, for example, a closet or a shower curtain rod. The mechanism has a bushing with a center threaded opening for receiving a threaded shaft of a bolt. A lock washer, which is resiliently deformable in one direction only, is attached to the head of the bolt. The bolt with the lock washer is threaded into the bushing. The bushing is then mounted on an end portion of a first tube. The first tube is slidable inside a second tube of larger diameter. When the first tube is telescoped within the second tube, an applied axial force causes the washer to deform and thus allows the first tube with the attached bushing, bolt, and washer combination to slide along the inside of the second tube, allowing the assembly of the two telescoping tubes to expand in length. Once the bolt and washer combination has been pulled through the tube in one direction and the axial force is no longer applied, the deformed washer returns to its original shape. Thereafter, the bolt and washer combination cannot be pushed back, thus preventing collapse of the assembly.

8 Claims, 2 Drawing Sheets

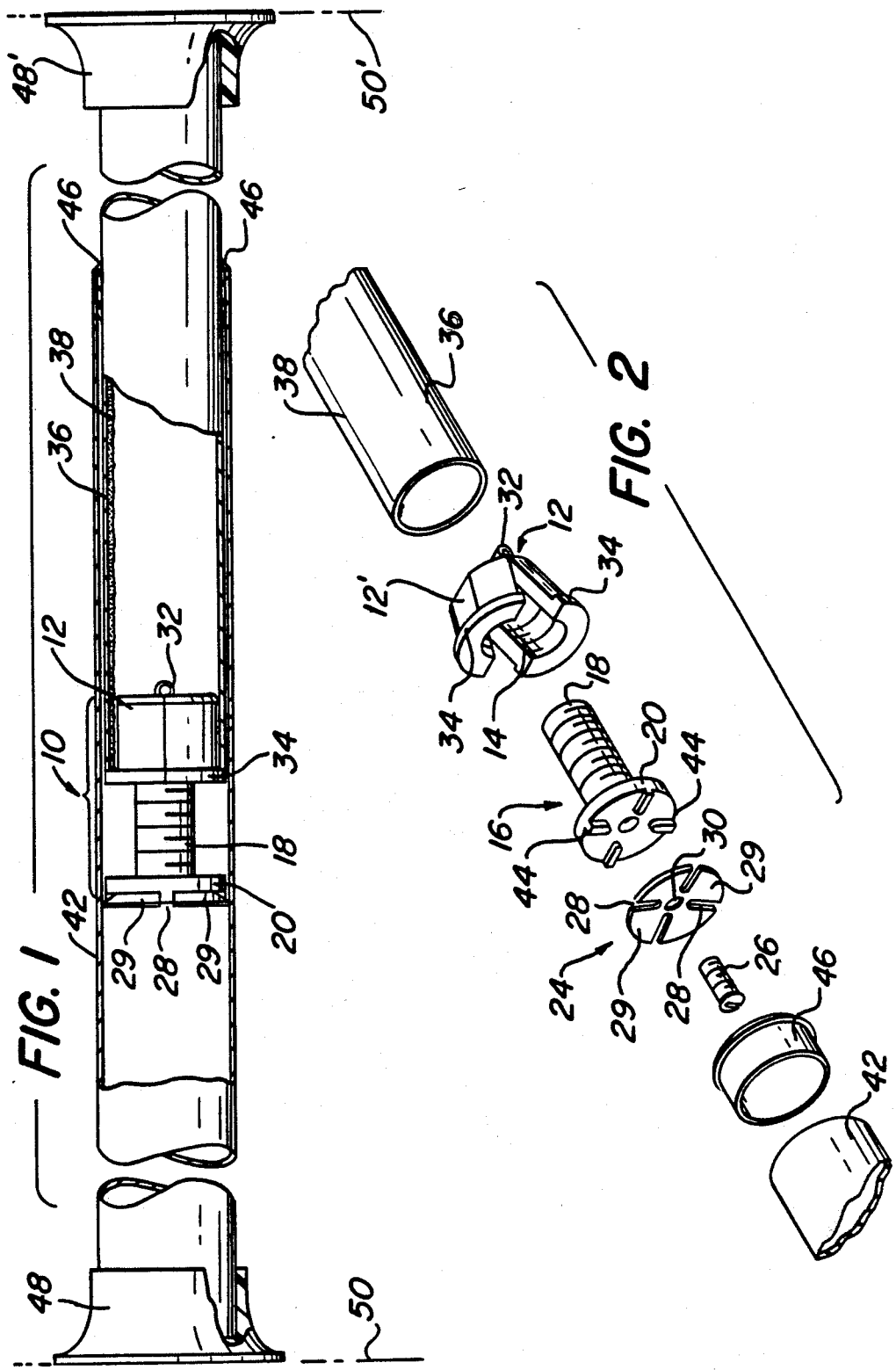

EXPANDER MECHANISM FOR TELESCOPING TUBES

BACKGROUND OF THE INVENTION

The present invention relates to an expander mechanism to be used with telescoping tubing. This invention is particularly suited for use with telescoping closet rods or shower curtain rods, but is by no means limited to such applications.

The concept of telescoping tubing is well known. Once the tubes are adjusted to the desired length they must be fixed in place. This has been done in the past by anchoring opposite ends of the tubes against facing walls (thus disfiguring the walls) or by using elaborate and complicated locking elements within the tubes which are costly and time consuming to manufacture.

One known system uses a spring loaded mechanism inside the telescoped tubes to expand the tubes and to provide the force needed to secure the expanded tubes in place. The spring mechanism typically consists of a coiled spring and a concave lock washer. The lock washer is attached to one end of the spring by a rivet, and the entire mechanism is located within one of the telescoped tubes. However, because of the structure of the spring mechanism the telescoped tubes are unable to bear anything more than very light loads.

The present invention utilizes a simple mechanism for adjusting the telescoping relation between the tubes and for securing the tubes in place once they are expanded to their desired length. In addition, the structure of the present invention greatly increases the load bearing capabilities of the expanded tubes. The mechanism is easy to operate and can be manufactured quickly and inexpensively.

SUMMARY OF THE INVENTION

The present invention is an expander mechanism for use in telescoping tubing, for instance for an expandable shower curtain rod or closet rod, and comprises a bushing having a threaded center opening for receiving a threaded shaft of a bolt. The bolt and the bushing are made of a resilient molded plastic such as nylon, acetal, or impact styrene. A lock washer is attached to the bolt head. The head of the bolt is of slightly smaller diameter than the lock washer to prevent deformation of the lock washer in a direction which would permit the telescoped tubes to collapse. The lock washer has spaced radial slots, so as to define a series of resilient segments, and is preferably made of stainless steel.

The bolt with the attached lock washer is threaded into the bushing. The bushing is then mounted on an end portion of a first tube. The first tube, bolt, and washer combination is slidable inside a second tube having a larger i.d. than the first tube. The lock washer has a slightly larger diameter than the i.d. of the second tube whereby the resilient segments deform in only one direction and the first tube, bolt, and washer combination slides in only one direction within the second tube.

The tubes are telescoped together, both tubes are then grasped, one in each hand, and pulled apart lengthwise whereby the washer segments deflect and the bolt and washer combination slides along the inside of the second tube. The telescoping tubes thereby expand in length. Once the tubes reach the approximate desired length, the opposite ends of the telescoping tubes are placed against two opposing walls. The tubes are rotated around their longitudinal axes, in opposite directions with respect to each other, so as to partially withdraw the bolt from the bushing whereby the assembly expands lengthwise sufficiently to lock the tubes in place between the walls. Once the bolt and wahser combination has been pulled through the second tube in one direction, it cannot be pushed back. This keeps the tubes in the expanded telescoped relation, preventing collapse of the tubes, thus forming a secure rod which can be used, for example, in a closet or shower.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a partial section of the adjustable screw mechanism of the invention contained within two telescoping tubes.

FIG. 2 is an exploded view of the mechanism.

DESCRIPTION OF THE INVENTION

Figure 3:
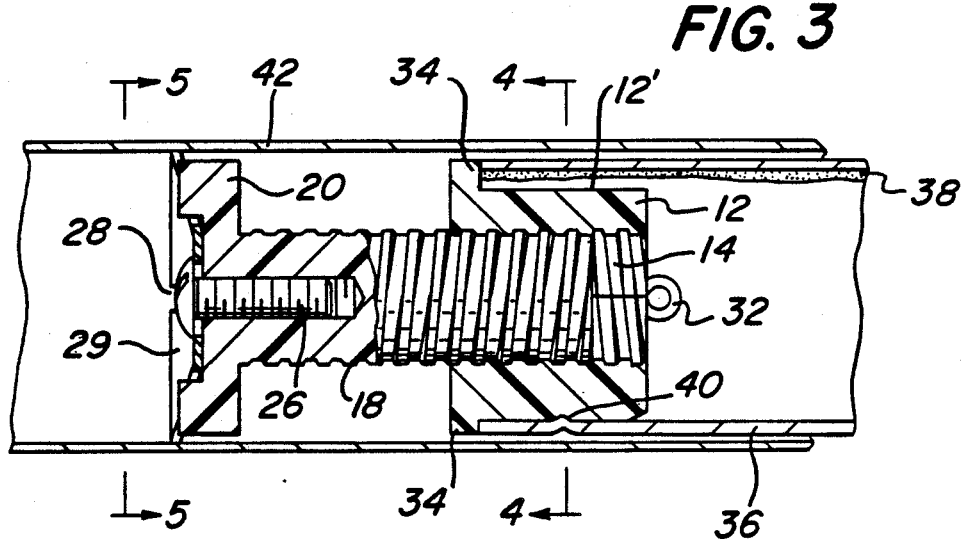
FIG. 3 is a sectional view of the mechanism showing attachment of the bushing and bolt and a cutaway of a portion of the bolt and washer.

Referring now to the drawings wherein like numerals indicate like elements there is shown in FIG. 1 an expander mechanism 10 according to the invention. The mechanism 10 comprises a bushing 12 having a threaded center opening 14 (FIG. 2) for receiving a bolt 16. Bolt 16 comprises a threaded shaft 18 and a flat circular head 20.

Figure 4:
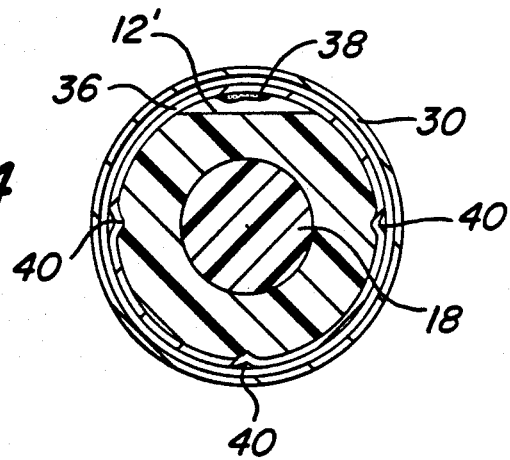
FIG. 4 is a sectional view taken along lines 4—4 in FIG. 3.
Figure 5:
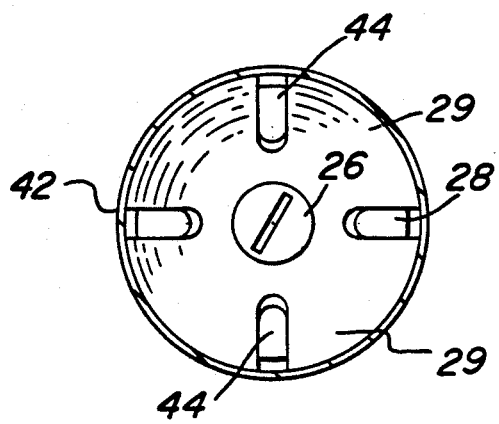
FIG. 5 is a sectional view taken along lines 5—5 in FIG. 3.

A lock washer 24 is mounted on head 20 by a screw fastener 26. Lock washer 24 is provided with slots 28 and a center opening 30 and is preferably made of stainless steel. The slots 28 define a series of resilient segments 29 in lock washer 24. Bushing 12 and bolt 16 are preferably made of molded impact styrene plastic, or any resilient plastic such as nylon or acetal. In the preferred embodiment bushing 12 comprises two pieces which are attached together at one end by hinge 32. However, the invention is not limited to a split bushing. Bushing 12 may be made in one piece without departing from the scope of the invention. In the illustrated embodiment, each of the two pieces of bushing 12 is provided with a semicircular lip or flange so as to define a full lip or flange 34 when closed. Bolt 16 with lock washer 24 is threaded into opening 14. When closed, bushing 12 also has an internally threaded opening 14. Bushing 12, now containing bolt 16, is inserted in an end portion of a first tube 36 so that flange 34 covers the outer edge of the tube. The bushing may be secured in position by a friction fit, but the end of tube 36 is preferably crimped to hold the bushing securely in place. Bushing 12 may be provided with a flat 12' which provides clearance between the bushing and a seam 38 along the interior wall of tube 36, although the flat may be omitted if desired. If tube 36 is crimped, the bushing 12 is permanently fixed in place by one or more dimples 40 formed in the tube wall as a result of the crimping operation (FIG. 4).

Bolt 16, lock washer 24, and tube 36 form a unit which is slidable within a second tube 42 having a larger i.d. than tube 36. Lock washer 24 is provided with a plurality of slots 28. Although four slots are shown in the drawings, a different number of slots (e.g. six or eight) may be employed. At least one integrally molded locating tab 44 protrudes from bolt head 20 and enters a slot 28 of lock washer 24 to align washer opening 30 and a central opening in head 20 for receiving a screw fastener 26. Four tabs are preferred and are shown in the drawings, but any other number of tabs will suffice. The tabs 44 also prevent lock washer 24 from rotating on bolt head 20.

After bushing 12, with bolt 16 bearing lock washer 24, is crimped into one end of tube 36, tube 42 is placed over the opposite end of tube 36 and moved along tube 36 until tube 42 and tube 36 are in a telescoped relationship as shown in FIGS. 1 and 3. From the configuration shown in FIG. 1, tubes 36 and 42 may then be grasped, one in each hand, and pulled apart in an axial or lengthwise direction. The pulling action causes the lock washer segments 29 to deform resiliently so that the segments 29 wipe against the interior wall of tube 42. The lock washer assumes a generally concave configuration. The bolt and washer combination therefore slides along the interior wall of tube 42 as the telescoped tubes 36 and 42 expand in length.

Once the telescoped tubes reach the approximate desired length, i.e., spanning a distance between two facing walls, they are not drawn apart any further. The washer segments 29 therefore return to their original configuration, locking the bolt and washer combination in place inside tube 42. Washer 24 cannot be pushed back (in the opposite direction) along the inside of the tube as the bolt head 20 prevents the washer segments 29 from deforming except in a direction which allows the tubes to be drawn apart. The washer 24 therefore keeps the tubes expanded and prevents collapse. In addition, washer 24 is firmly secured against rotation with respect to tube 42.

The opposing ends of tube 36 and 42 are covered with escutcheons 48, 48'. Once expanded to the desired length, the telescoped tubes are wedged lightly between two opposing walls 50 and 50'. Further rotation of tubes 36 and 42 around their longitudinal axes (in opposite directions with respect to each other) so as to partially withdraw the bolt shaft 18 from bushing 12 causes further lengthwise expansion of the tubes 36 and 42 thereby firmly locking the tubes in place.

The present invention may be embodied in other specific forms without departing from the spirit or essential attributes thereof and, accordingly, reference should be made to the appended claims, rather than to the foregoing specifications, as indicating the scope of the invention.

We claim:

1. An expander mechanism for telescoping tubes comprising:
   (a) first and second telescoping tubes, said second tube having an interior wall;
   (b) a bushing having a threaded center opening, said bushing being comprised of two pieces hingedly attached together and being mounted on an end portion of the first tube;
   (c) a bolt comprising a head and a threaded shaft adapted to be received by complementary threads of the opening in the bushing; and
   (d) a lock washer attached to the head of the bolt and having a peripheral portion in engagement with said interior wall, said lock washer being resiliently deformable in only one direction to assume a generally concave configuration upon application of a force to the peripheral portion of said lock washer, said lock washer having a generally concave configuration when said peripheral portion is in engagement with said interior wall, said first tube being inserted into said second tube so as to be slidable therein and thus allowing the telescoping tubes to be expandable in one direction only.

2. An expander mechanism for a telescoping support rod, comprising:
   (a) first and second telescoping tubes, said second tube having an interior wall;
   (b) a bushing having a threaded center opening, said bushing being mounted within said second tube on an end portion of the first tube;
   (c) a bolt comprising a head and a threaded shaft adapted to be received in the opening in said bushing; and
   (d) a lock washer attached to the bolt head and having a peripheral portion in engagement with said interior wall, said lock washer being resiliently deformable in only one direction to assume a generally concave configuration upon application of a force to the peripheral portion thereof, said lock washer having a generally concave configuration when said peripheral portion is in engagement with said interior wall, the combination of said bolt and washer being threaded inside the bushing, said bushing being mounted on an end portion of the first tube, and the first tube being inserted into the second tube, so as to be slidable therein in one direction only.

3. The apparatus of claim 2 wherein the bushing is formed from two molded plastic pieces which are hingedly attached.

4. The apparatus of claim 2 wherein the lock washer has a diameter which is slightly larger than the inner diameter of the second tube.

5. The apparatus of claim 4 wherein the lock washer has a slightly larger diameter than the diameter of the bolt head.

6. The apparatus of claim 4 wherein the bushing is mounted on said first tube by dimpling a portion of the tube around the bushing.

7. An expander mechanism for a telescoping support rod, comprising:
   (a) first and second telescoped tubes, said second tube having an interior wall;
   (b) a bushing having a threaded center opening for receiving a threaded shaft of a bolt, the bushing being mounted on an end portion of the first tube;
   (c) a bolt having a threaded shaft and a head to be received by the complementary threads in the bushing; and
   (d) a lock washer having spaced radial slots defining resiliently deformable segments, said lock washer being attached to the bolt head and having a slightly large diameter than the diameter of the bolt head for being in engagement with said interior wall, said lock washer having a generally concave configuration when said lock washer is in engagement with said interior wall, whereby the lock washer is resiliently deformable in one direction only, the combination of said bolt and washer being threaded inside the bushing, the bushing being mounted on an end portion of the first tube, and the first tube being mounted inside the second tube so as to be slidable therein in one direction only.

8. An expander mechanism for a telescoping support rod comprising:
  (a) first and second telescoped tubes, said second tube having an interior wall;
  (b) a bushing, having a threaded center opening for receiving a threaded shaft of a bolt, the bushing being mounted on an end portion of the first tube;
  (c) a bolt, having a head and a threaded shaft, the threaded shaft adapted to engage the threaded center opening of the bushing when the first tube is telescoped within the second tube and each tube is rotated in opposite directions around its longitudinal axis; and
  (d) a lock washer, which is resiliently deformable in one direction only, and is attached to the head of the bolt, said lock washer having a generally concave configuration when a peripheral portion of said lock washer is in engagement with said interior wall, the bolt and lock washer combination being threaded inside the bushing, the bushing being mounted on an end portion of the first tube, and the first tube being mounted inside the second tube, whereby an applied axial force causes the first tube with the attached bushing, bolt and lock washer combination to slide in only one direction along the inside of the second tube allowing the first and second telescoping to expand.

* * * * *